(No Model.) 2 Sheets—Sheet 2.

J. T. KING.
EXHAUST STEAM HEATING APPARATUS.

No. 345,850. Patented July 20, 1886.

WITNESSES
Ed. A. Newman.
Al. C. Newman.

INVENTOR
John T. King.
By his Attorneys
Baldwin, Hopkins, & Peyton.

UNITED STATES PATENT OFFICE.

JOHN T. KING, OF MADISON, WISCONSIN.

EXHAUST-STEAM HEATING APPARATUS.

SPECIFICATION forming part of Letters Patent No. 345,850, dated July 20, 1886.

Application filed April 25, 1885. Serial No. 163,462. (No model.)

*To all whom it may concern:*

Be it known that I, JOHN T. KING, of the city of Madison, county of Dane, and State of Wisconsin, have invented certain new and useful Improvements in Exhaust-Steam Heating Apparatus, of which the following is a specification, reference being had to the accompanying drawings.

I am aware that heretofore exhaust-steam has been used for heating purposes by direct connections between the exhaust from the engine and the heating-mains, but with imperfect provision for preventing back-pressure on the engine, and at the same time fully utilizing the heat of the exhaust-steam.

My invention is made up of improvements on that shown in United States Patent No. 256,089; and its object is to provide an apparatus for exhaust-steam heating which will avoid the loss of power occasioned by back-pressure, and at the same time fully utilize the heat of the exhaust-steam and secure the preservation of the water of condensation for boiler-feed purposes. I attain these objects by means of the apparatus and system illustrated in the accompanying drawings, in which—

Figure 1:
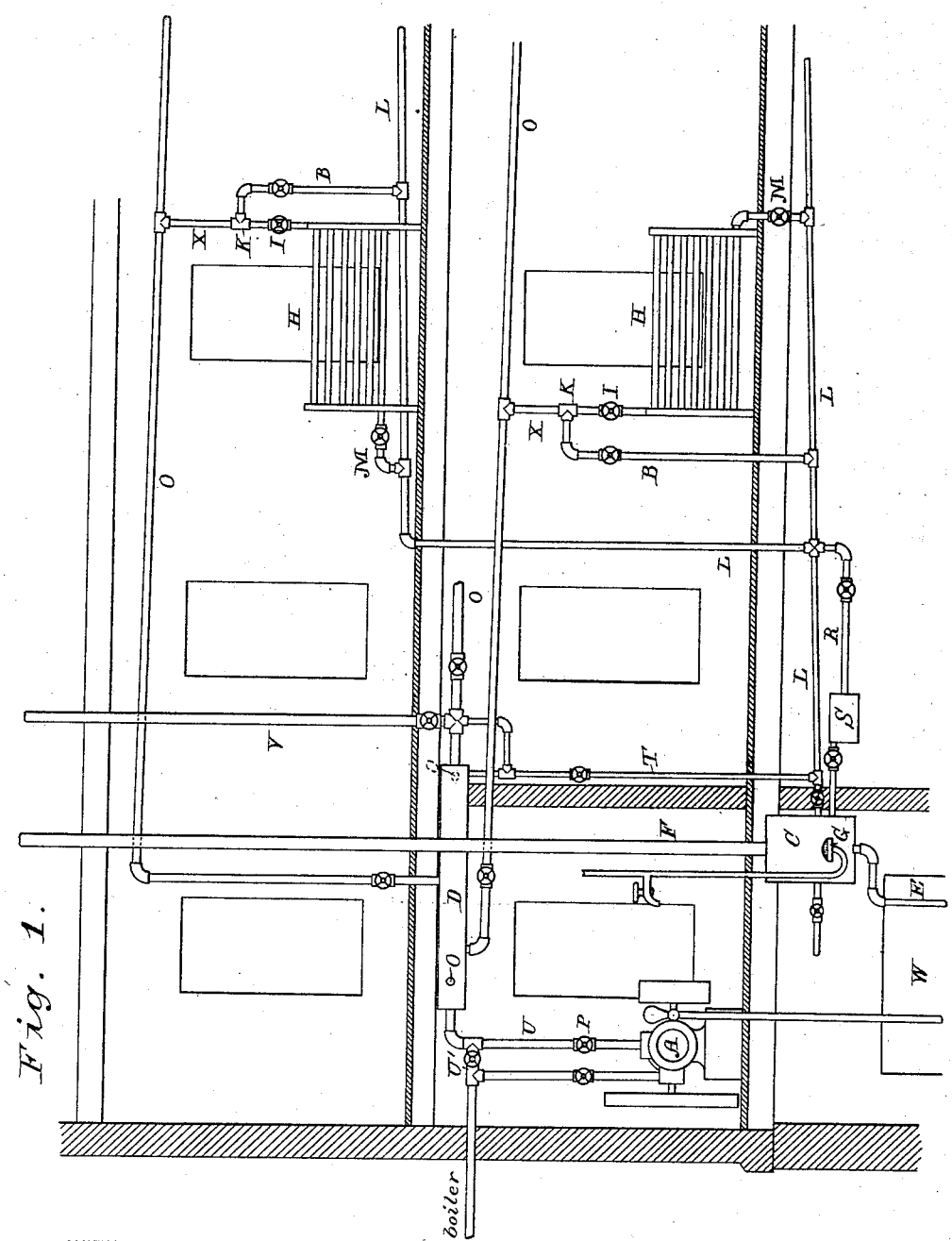
Figure 2:
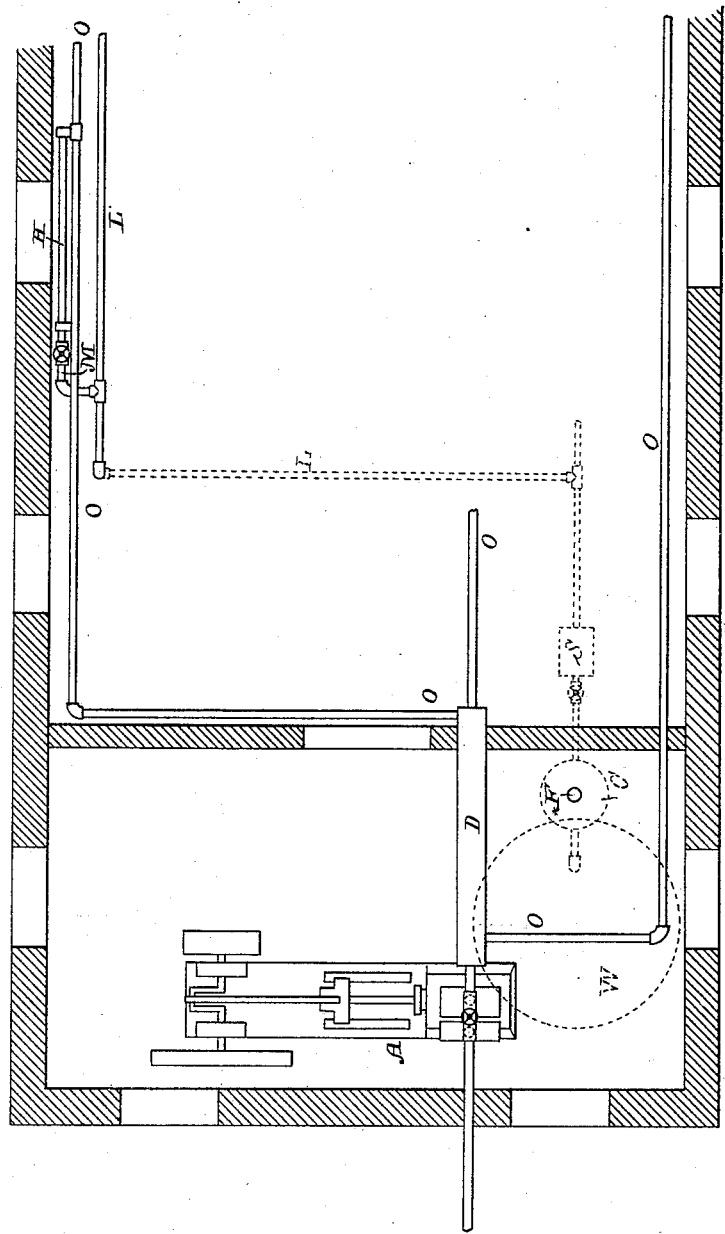

Figure 1 is a vertical section of a building in which is shown an apparatus embodying my improvements, and Fig. 2 a plan of an engine-room.

Referring to the letters marked on the drawings, A indicates the engine, with exhaust-pipe U, leading therefrom to the expansion-chamber or drum D.

O O are the mains or supply-pipes connecting the expansion chamber or drum D with the various coils or heaters H H, which are in turn connected to the return or drip pipes L L.

B B are the switches connecting the mains O O with the return or drip pipes L L, that open into the expansion and condensing chamber C, which is provided with a cold-water spray-jet, G, and stand-pipe, F.

E is the outlet-pipe of the chamber C, leading therefrom to the hot-well W, from which the feed-water for the boiler may be taken.

R is the connection from the return or drip pipes L to the live-steam trap S, which communicates with chamber C.

V is the direct exhaust-pipe, connected with the expansion-chamber or drum D.

T is the drip-pipe, leading from expansion-chamber or drum D to return-pipe L.

The mode of construction and application of my invention and its operation are as follows: I first place a drum or expansion-chamber, D, as near the engine as may be convenient, the size of which should be governed by the size and capacity of the engine—say for a ten-inch by fifteen-inch engine, exhaust-pipe three inches, an expansion chamber or drum six inches by six feet is found to be sufficient. The office of this expansion chamber or drum and the mains leading therefrom is to give instantaneous relief to the exhaust from the engine, practically the same as if the exhaust-steam escaped into the open air. I connect the exhaust U of the engine to the expansion chamber or drum D, and from it I lead mains or supply-pipes O O to all the different compartments of the premises to be heated, said mains being of sufficient aggregate capacity to maintain the full benefit of the relief intended to be given to the engine by the application and use of my invention. All mains drip away from the expansion chamber or drum D, and from these mains, which, together with the drum or chamber D, are placed overhead, I drop to the top of the first coil or heater H in the line.

In the drop or feed pipe X, leading to the coil or heater, I place a valve or stop-cock, as at I. Just above this valve or stop-cock, at K, I place a branch pipe, which leads down to and communicates with the return or drip pipe L. This is known as the switch B, its object being to cut out the coil or heater H and conduct the exhaust-steam directly from the main O to the return or drip pipe L. I also place a valve or stop-cock in the switch B, so as to control its use. The coil or heater H is connected to the return or drip pipe L at its outlet M at the bottom, a stop-cock or valve being inserted in such connection. The coil or heater should always drip toward its outlet. The same course of construction is then pursued with all of the heaters of the entire system, each heater being provided with a switch, B, in the manner above described.

In order to secure an efficient drainage for the apparatus, all of the return or drip pipes must be placed at an elevation sufficiently high at their point of connection with the outlet of the extreme heater in each department to allow a proper fall throughout their entire course back to the point of their concentration into one or more of the pipes connecting them with the expansion and condensing chamber C.

The expansion and condensing chamber C is of such shape and capacity as may be required to receive the surplus exhaust-steam from all of the return or drip pipes without obstructing its free passage.

The office of the expansion and condensing chamber C is to provide for the final and complete expansion and condensation of such portion of the exhaust-steam as shall pass through the system of pipes and heaters without having become condensed. For the purpose of such condensation I arrange in the chamber C the spray-jet G, for cold water, with which the exhaust-steam comes into contact, being thereby condensed and prevented from passing away and being lost, and at the same time heating the cold water used in the operation, which water is supplied in such quantity only as may be necessary to keep up the supply for boiler purposes. The cold spray-jet will thoroughly condense the steam in the chamber C, so that it will not escape and waste. Besides this, it causes the lime and impurities of the water of condensation, as well as of the water of the spray-jet, to be collected in the condenser, and prevents them from being discharged into the hot-well, because the steam being condensed warms the water of the spray to the proper point of separating such impurities. The result is the water can be used from the hot-well for the boiler in a pure state, and the impurities can occasionally be removed from the condenser. These results I have found in actual practice to be as stated, and to be of material advantage in a steam-heating apparatus.

To the top of the chamber C is attached the stand-pipe F. The office of this stand-pipe is to permit the escape of any steam which might fail to be condensed in the chamber C, and to prevent any back-pressure. Being beyond the heaters in the course of travel of the steam under pressure they will fill with steam first before any non-condensed steam can escape from it. The heaters will also remain full while any non-condensed steam may be escaping from the stand-pipe.

The size of the stand-pipe is generally the same as that of the exhaust-pipe U; but must always be sufficient to insure the absolute freedom of the engine.

To the base of chamber C is attached the water-outlet pipe E, which communicates with the hot-well W, discharging at the bottom of same, the chamber C being placed high enough above the hot-well to insure easy clearance for the water.

The chamber C and accompanying stand-pipe F may be located at the most convenient point for the junction of the return or drip pipes L L, as the outlet-pipe E can be led to the hot-well W, which is generally located near the boiler.

The combined area of the several return or drip pipes should be at least equal to, if not greater than, that of the stand-pipe.

The heaters or coils H H may be cut out by means of the switches B B, and the exhaust-steam passed from the mains or supply pipes O O to the return or drip pipes L L, and so on through to the chamber C, without passing through the coils or heaters H H. This enables the engineer to obtain the greatest amount of condensation possible in warm weather without unnecessary heat. This system may also be used with live steam when the engine is idle, for which purpose I place a stop-cock at P in main exhaust-pipe U of engine. Above this stop-cock I connect a live-steam pipe, U′, to the exhaust-pipe U, so that live steam may be passed into the expansion chamber or drum D, and thence to the several mains O O.

To take care of the return or drip, I place a stop-cock in each return or drip pipe L, next to the condensing-chamber C, and behind these stop-cocks I connect branch R, which leads to the live-steam trap S, the outlet of the trap being connected to condensing-chamber C, so that the water returns to the hot-well W. This live-steam trap is supplementary to the condensing-chamber C, affording an additional condensing-surface. It first collects the water of condensation formed in the pipes, which then passes into the chamber C. It serves to make the working of the apparatus more satisfactory by providing more thoroughly for condensation when live steam is used, because it acts in some measure as a preliminary condenser.

The several return or drip pipes may be each supplied with a live-steam trap, or they may all be connected with one, governed always by the amount of pipe to be drained. This makes the system applicable to exhaust or live steam, or both.

The expansion chamber or drum D is provided with a direct exhaust-pipe, V, and also with a sufficiently-large drip-pipe, T, to keep it clear of all water, which drip-pipe communicates with one of the return or drip-pipes L L.

The exhaust-pipe V enables the engineer to control the supply and pressure of steam in the heaters, and to regulate the heat by turning its cock, (shown in Fig. 1,) so as wholly or partially to open or close the exhaust-pipe.

As all coils or heaters are fed from bottom of mains, no valves being used in the mains or returns, stop-cocks only being used in them, the exhaust passes freely through the mains and heaters into the returns, and thence to the condensing-chamber C; consequently but little resistance is offered to the exhaust of the engine, as the area of the mains and returns is much greater than that of the exhaust-pipe at the engine.

By the use of stand-pipe F all the coils or heaters will fill, and at each exhaust of the engine receive a fresh supply of steam, keeping all hot without causing any back-pressure other than that of the atmosphere. The whole system is under the control of the operator at all times, whether using exhaust or live steam, or both, and all the pipes are as usual supplied with stop-cocks to supply or cut off steam, as may be desired.

In the construction of the system I aim at all times to keep the aggregate area of the pipes on the increase from the engine to the condensing-chamber C, so as to provide absolute freedom for the exhaust. I also deem it best to use short manifold coils or heaters, as they offer the least resistance, and more effectively utilize the heat from the exhaust-steam.

Having described my invention, what I desire to secure by Letters Patent of the United States is—

1. In an exhaust-steam heating apparatus, the combination of exhaust-steam pipe U, expansion-chamber D, exhaust-pipe V, distributing-pipes O, one or more heaters, H, drip-pipes L, condensing-chamber C, stand-pipe F, and well W, all constructed, arranged, and operating together substantially as set forth.

2. In a steam-heating apparatus, the combination of the return or drip pipes, the condenser-chamber C, into which they empty, the stand-pipe F, and the cold-water jet within the chamber C, by which the steam is condensed and impurities deposited in the chamber, substantially as set forth.

In testimony whereof I have hereunto subscribed my name.

JOHN T. KING.

Witnesses:
W. G. WALKER,
J. H. PALMER.